(No Model.)

I. RICHARDSON.
HARVESTER DROPPER.

No. 254,378. Patented Feb. 28, 1882.

WITNESSES:

INVENTOR:
J. Richardson
BY
Munn & Co
ATTORNEYS.

UNITED STATES PATENT OFFICE.

IRA RICHARDSON, OF LEMOND, (MERIDEN P. O.,) MINNESOTA.

HARVESTER-DROPPER.

SPECIFICATION forming part of Letters Patent No. 254,378, dated February 28, 1882.

Application filed August 24, 1881. (No model.)

*To all whom it may concern:*

Be it known that I, IRA RICHARDSON, of Lemond, (Meriden P. O.,) in the county of Steele and State of Minnesota, have invented a new and useful Improvement in Harvester-Droppers, of which the following is a full, clear, and exact specification.

Figure 1:
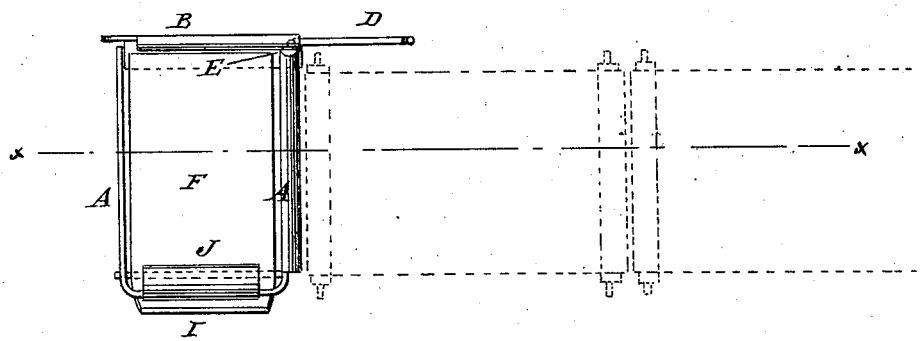
Figure 2:
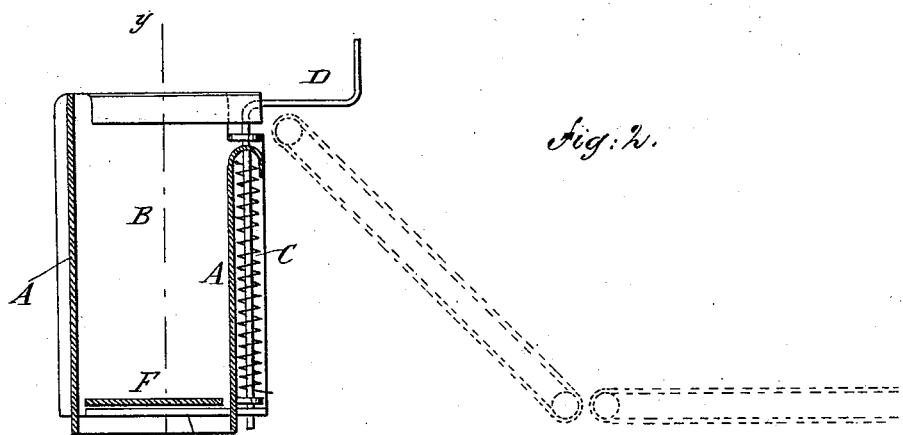
Figure 3:
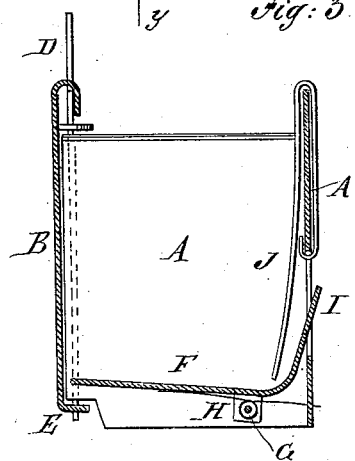
Figure 4:
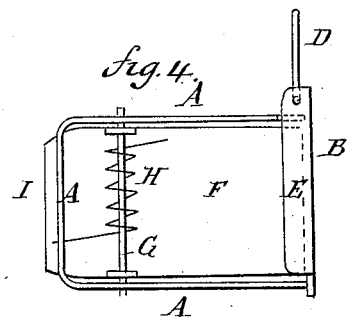

Figure 1 is a plan view of my improvement. Fig. 2 is a sectional elevation of the same, taken through the line $x\,x$, Fig. 1. Fig. 3 is a sectional elevation of the same, taken through the line $y\,y$, Fig. 2. Fig. 4 is a bottom view of the same.

Similar letters of reference indicate corresponding parts.

The object of this invention is to facilitate collecting cut grain and dropping it to the ground in compact and even heaps.

The invention consists in a harvester-dropper constructed with the box, the door provided with a handle held closed by a spring, and having a flange upon its lower end, a tilting bottom resting upon the flange of the door, provided with a spring to raise it into place, and having a flange upon its inner end, and the guard-plate to prevent clogging and facilitate the discharge of the grain, as will be hereinafter fully described.

A represents a box which is open at the top, is made of suitable size to receive the cut grain, and is designed to be attached to the harvester in place of the binders' table, and in such a position as to receive the cut grain from the elevator.

The rear side, B, of the box A is hinged at its side edge to the said box A, and is provided with a spring, C, of sufficient strength to close the said side or door and hold it closed against the outward pressure of the cut grain being collected within the said box A. To the upper end of the hinged edge of the door B is attached an arm, D, to serve as a handle in opening the said door. The lower end of the door B is bent inward to form a ledge or flange, E, or has a ledge or flange, E, attached to it. The flange E serves as a rest or support for the rear part of the hinged platform F, which forms the bottom of the box A. The platform F is hinged to the sides of the box A by a rod, G, or other suitable means, and is provided with a spring, H, coiled around the rod G or otherwise supported. One end of the spring H is attached to the side of the box A, and its other end is attached to or rests against the lower side of the platform F. The spring H is made of sufficient strength to raise the platform F to its place after the said platform has been released from the downward pressure of the grain. The rear part, I, of the platform F is bent upward at right angles, or nearly at right angles, as shown in Fig. 3, and projects along the inner side of the plate J, which extends along the inner side of the front of the box A, and is attached at its upper end to the upper part of the said front of the said box A in such a manner as will prevent the grain from catching upon it, and that will allow it to push the grain sufficiently to cause it to fall from the platform F in a compact heap.

The plate J prevents any of the cut grain from becoming entangled with the upwardly-projecting part I of the platform F, and also insures the proper discharge of the grain.

In using the dropper, when enough cut grain for a heap has been received in the box A the driver operates the handle D to swing the door B open. As the door B swings open the flange E is withdrawn from beneath the platform F and allows the said platform to be tilted by the weight of the cut grain, dropping the grain to the ground. As the platform F tilts its upwardly-projecting part I strikes against the plate J, pushes it forward, giving a gentle push to the cut grain and causing it to be deposited upon the ground in a compact and even heap, so that it can be conveniently bound into several neat bundles or left to dry and cure, ready to be stacked or put into a mow loose.

Having thus fully described my invention, I claim as new and desire to secure by Letters Patent—

1. A harvester-dropper constructed substantially as herein shown and described, consisting of the box A, the hinged door B, having handle D and flange E, the spring C, the tilting bottom F, having flange I, and the guard-plate J, as set forth.

2. In a harvester-dropper, the combination, with the box A, of the door B, having arm D and flange E, the spring C, the tilting bottom F, having flange I and spring H, and the plate J, substantially as herein shown and described, whereby the cut grain is received and dropped to the ground in a compact heap, as set forth.

3. In a harvester-dropper, the combination, with the box A, of the door B, having flange E and tilting bottom F, substantially as herein shown and described, whereby the tilting bottom is supported by the door and is released to drop the grain by opening the said door, as set forth.

4. In a harvester-dropper, the combination, with the box A, the door B, and the tilting bottom F, of the springs C and H, substantially as herein shown and described, whereby the said door and bottom are brought back to their places automatically when the grain has been dropped, as set forth.

5. In a harvester-dropper, the combination, with the box A and the tilting bottom F, having flange I, of the guard-plate J, substantially as herein shown and described, whereby the tilting bottom is guarded against becoming clogged and the discharge of the grain is facilitated, as set forth.

IRA RICHARDSON.

Witnesses:
GEO. W. HATCH,
H. E. JOHNSON.